Patented Sept. 2, 1947

2,426,648

UNITED STATES PATENT OFFICE 2,426,648

MANUFACTURE OF SULFUR COMPOUNDS

Walter A. Schulze and Willie W. Crouch, Bartlesville, Okla., assignors to Phillips Petroleum Company, a corporation of Delaware No Drawing. Application October 19, 1943, Serial No. 506,904

14 Claims. (Cl. 260—609)

This invention relates to an improved process for the manufacture of organic sulfur compounds. In a specific embodiment, this invention relates to the direct addition of a compound having the formula RSH, in which R represents hydrogen or an organic radical substantially inert under the reaction conditions used, to an ethylenic linkage in an organic compound, in the presence of a novel catalyst to produce mercaptans and/or organic sulfides. A more specific and preferred embodiment involves the manufacture of useful mercaptans from olefins and hydrogen sulfide through the agency of hydrated boron fluoride, and the invention will be described in detail with particular reference to this embodiment.

The direct synthesis of organic sulfur compounds, especially mercaptans and sulfides (thioethers), by the addition of hydrogen sulfide or mercaptans to olefinic materials, with or without the presence of a catalyst has been reported by various investigators. However, the specificity of these reactions has not been of the order frequently desired, due to the elevated temperatures employed and/or lack of activity or specific action of the catalysts proposed.

An object of this invention is to manufacture organic sulfur compounds.

Another object is to effect catalytically the addition of (1) hydrogen sulfide or (2) mercaptans, to olefinic materials to produce (1) mercaptans and/or sulfides or (2) sulfides.

Another object of the present invention is to manufacture valuable mercaptans of from two to about 12 or more carbon atoms per molecule through the interaction of selected olefins or mixtures of olefins with hydrogen sulfide in the presence of a liquid catalyst.

A further object of the invention is to effect catalytically the direct addition of hydrogen sulfide to aliphatic, substituted aliphatic, and cyclic olefins to yield the corresponding mercaptan derivatives.

A still further object of this invention is to provide a process for mercaptan manufacture under controlled conditions whereby reaction between the selected olefin and hydrogen sulfide can be effected with virtually no decomposition of the product.

Another object of this invention is to manufacture mercaptans from olefinic hydrocarbons and hydrogen sulfide at mild conditions of temperature and pressure in the presence of a liquid hydrated boron fluoride catalyst.

Further objects and advantages of the invention will be apparent, to one skilled in the art, from the accompanying disclosure and discussion.

We have discovered that the sulfur-compound-forming reactions referred to above are smoothly and efficiently accomplished under exceptionally mild conditions under the catalytic influence of hydrated boron fluoride. Since the catalyst of this invention is very active, it may be applied at relatively low temperatures to a great variety of olefinic materials to give the desired corresponding sulfur compounds with a minimum of undesirable secondary reactions.

Our novel and active catalyst may be applied to the reaction between mercaptans and olefinic hydrocarbons to produce sulfides. It may also be applied to the reaction between $H_2S$ and olefins to produce mercaptans as herein discussed. While in the latter reaction some formation of sulfides may be expected due to a secondary reaction between the product mercaptan and the olefin or to other factors, it has been found in practice that such sulfide formation may be kept to a desired low and even negligible value by maintaining a substantial excess of $H_2S$ in the reaction zone and/or by operating at moderate temperatures which are still adequate for effecting the addition of $H_2S$ to olefins. On the other hand, when it is desired to produce sulfides as the product of an olefin-$H_2S$ reaction, the yield of sulfides may be materially increased by suitable control of reaction conditions, as by operating with higher olefin:$H_2S$ ratios. In any case, the activity of our catalyst makes possible the carrying out of the chosen reaction under moderate conditions which enable control of product to an exceptionally advantageous degree.

The process of the present invention in preferred embodiment comprises the contacting of controlled proportions of olefinic hydrocarbon, or mixtures of olefinic hydrocarbons, and hydrogen sulfide or mercaptan with a liquid boron fluoride hydrate catalyst under conditions selected to produce a substantial conversion of olefin to the corresponding mercaptan or sulfide, as the case may be. For example, in the use of the mercaptan-forming reaction, the hydrocarbon-hydrogen sulfide blend may be continuously contacted with the catalyst under conditions insuring thorough dispersion of the catalyst in the reactants, followed by a quiescent zone where the catalyst phase is continuously separated from the reaction products and returned to the contacting zone. The product layer may be continuously withdrawn from the catalyst separator for processing by suitable stabilization and distillation steps.

Alternatively, the reaction may be carried out in a batch operation with intermittent injection of feed into the contacting zone and intermittent withdrawal and subsequent processing of the product stream. In many instances, the incorporation of a diluent comprising pure non-olefinic hydrocarbons, such as n-pentane or fractions of natural or straight-run gasoline, may be advantageously utilized in controlling the reaction temperature and in maintaining a favorable hydrogen sulfide-olefin mol ratio without resorting to excessive pressures. In instances where mercaptans of high molecular weight and high viscosity are involved, the presence of a low viscosity diluent greatly aids in the catalyst separation step.

In a specific preferred embodiment of the invention, a $C_{12}$—$C_{14}$ olefin mixture derived from the catalytic polymerization of $C_3$ and $C_4$ refinery olefins is employed, in admixture with about 80 per cent n-pentane, as the hydrocarbon feed to the reaction. Enough hydrogen sulfide is added to the hydrocarbon mixture to give an $H_2S$-olefin mol ratio of from about two to about five. The resulting composite mixture, under a pressure of about 100 to 500 pounds per square inch gage, is then injected into a reaction zone where intimate contacting of feed and catalyst is accomplished by suitable means. For this particular system, the reaction temperature may be maintained between about 40 and 50° F., for optimum results, although higher and lower temperatures are operable. An emulsion of catalyst and product is continuously discharged into a catalyst separator, from which the product stream is withdrawn at a rate adjusted to give a reaction time of about 15 to 20 minutes. The catalyst separates by gravity in the separator and is continuously returned to the reactor. The product stream is stripped of its excess $H_2S$ and pentane diluent, and the resulting high-boiling material is distilled under reduced pressure to separate unreacted olefin from the mercaptan product.

The catalyst composition of the present invention is conveniently prepared by passing gaseous boron fluoride into water until the desired hydrate concentration is realized. During the solution of $BF_3$ in water, considerable heat is evolved and suitable means for cooling should be provided. Since the specific gravity of a completely saturated solution is approximately 1.77, convenient control of concentration can be effected by means of hydrometer determinations. The combination of water and boron fluoride may be carried out at atmospheric pressure or in a closed vessel at pressures of from 100 to 1000 pounds per square inch or higher. In either case the quantity of $BF_3$ taken up when complete saturation is effected corresponds substantially to one mol of $BF_3$ per mol of water. Catalyst formation under pressure is, however, more convenient and much less time-consuming. The catalyst preferably employed is water substantially saturated with $BF_3$, that is the mono-hydrate $BF_3$—$H_2O$; however, an excess of water may be used to give any desired $BF_3$—$H_2O$ mol ratio.

Maximum activity of the boron fluoride hydrate catalyst of this invention is ordinarily realized when the mol ratio of water to boron fluoride falls within the range of about 1.5:1 to about 1:1, although ratios as high as 2:1 may often be used. The exact composition of the catalyst phase and its mode of action are not entirely understood, since composition changes occur during the reaction. We have found that mercaptans can be dissolved in boron fluoride hydrate with the evolution of heat, indicative, probably of complex compound formation. In actual operation we have observed that the catalyst increases in volume to such an extent that after the formation of from five to ten volumes of mercaptan per volume of original catalyst charge, the volume of catalyst phase has increased by an increment equal to about 0.5 to 0.75 of the original volume charged. This volume increase is not as great as observed with pure mercaptan and new catalyst, hence it is concluded that the $H_2S$ content of the system and the diluent when employed may operate to prevent excessive solution of product mercaptans in the catalyst phase.

In the production of mercaptans with the above catalyst and by the hereinbefore described procedure, it is necessary to maintain a molal excess of hydrogen sulfide relative to the olefin content of the feed in order to favor the mercaptan reaction and to suppress undesirable polymerization and/or depolymerization of the olefin. Satisfactory reaction mixtures may have $H_2S$-olefin mol ratios of from about one to about six, with intermediate values of about two to about five being preferred.

The employment of a diluent in the reaction feed, while not mandatory, is often found to be advantageous. Where the manufacture of high molecular-weight mercaptans is involved, the use of a diluent affords a convenient means of maintaining the moderate temperatures required to prevent fragmentation of the primary product mercaptan. A further advantage derived from the use of a diluent liquid is the reduction of viscosity of high molecular-weight products, thus facilitating catalyst separation and effecting general improvement in the flow characteristics of the charge and product streams. The employment of diluents also favors the maintenance of favorable $H_2S$-olefin mol ratios in the feed without the necessity of resorting to excessively high pressures. Saturated hydrocarbons are ordinarily preferred as diluents, and are usually selected from narrow-boiling-range fractions of natural or straight-run gasoline. The diluents may be selected on the basis of their ease of separation from the product mercaptans. Thus with high-boiling mercaptans, a diluent such as n-pentane might be selected, whereas in the production of ethyl mercaptan a 200–250° F. fraction of natural gasoline would be satisfactory. The mount of diluent employed will obviously depend on any or all of the factors previously mentioned, and may vary from 10 to 90 volume per cent of the hydrocarbon feed.

Because of the high degree of activity displayed by the catalyst compositions of this invention, moderate reaction temperatures may be employed with a wide variety of olefin reactants. Substantially atmospheric temperatures, such as those ranging from about 32° F. to about 150° F. are usually adequate to effect the conversion of olefins of two to 16 or more carbon atoms per molecule to the corresponding mercaptans. The temperature of reaction may vary with the particular olefin involved. Thus temperatures in excess of 100° F. are ordinarily required for ethylene and propylene reactions, while temperatures of 40 to 45° F. are adequate to effect the conversion of dodecylenes to mercaptans.

Because of the moderate reaction temperatures which are a feature of this invention, reaction pressures are largely determined by the volatility of the olefin, the $H_2S$ concentration, and the quantity of diluent employed. With the catalyst of this process, liquid phase operation is especially desirable, and sufficient pressure and diluent are usually employed in order to fulfill this condition. Thus pressures of from about 100 pounds gage to 1000 pounds or more are ordinarily adequate.

The flow rate of feed to the reaction zone is selected to conform with catalyst activity, the nature of the olefinic component, and the desired depth of conversion. In order to obtain an olefin conversion of 80 per cent or more per pass with an active catalyst, the olefin feed rate, expressed independently of the $H_2S$ and diluent, may range from about 0.5 to about 5 liquid volumes per volume of catalyst per hour.

The olefinic hydrocarbons which may be reacted with hydrogen sulfide in carrying out this invention are those containing at least one ethylenic bond, and include aliphatic olefins, cyclic olefins, and substituted aliphatic and cyclic olefins in which the substituting group or groups may be hydrocarbon or non-hydrocarbon radicals of such character that they do not interfere with the primary reaction.

In order to further illustrate the specific uses and advantages of the present invention, the following exemplary operations will be described. However, since these and numerous other process modifications will be obvious in the light of the foregoing disclosure, no undue limitations are intended.

Example I

Ethyl mercaptan was prepared from ethylene and hydrogen sulfide in the presence of boron fluoride hydrate. The catalyst was prepared by bubbling gaseous $BF_3$ through a body of water held in an ice bath until no more $BF_3$ could be absorbed. The hydrate so prepared corresponded approximately to the empirical formula $BF_3:H_2O$. In order to work under liquid phase conditions, the feed to the reactor was prepared with an inert diluent comprising a 200–250° F. fraction of natural gasoline. The feed blend was made up to give an $H_2S$-ethylene mol ratio of two, and the final composition in per cent by weight was as follows: hydrocarbon diluent, 56.7; ethylene, 14.2; hydrogen sulfide, 29.1. This mixture was continuously charged to a turbo-mixer type reactor containing the catalyst under a pressure sufficient to maintain liquid-liquid contacting in the reactor. The reaction conditions are listed herewith:

| | |
|---|---|
| $H_2S$—$C_2H_4$, mol ratio | 2 |
| Feed-catalyst, volume ratio | 3 |
| Contact time, minutes | 32 |
| Temperature, °F. | 130–135 |
| Pressure, p. s. i. g | 800 |

The contents of the reactor in the form of an emulsion were continuously discharged into a catalyst separator from which the mercaptan-hydrocarbon layer was continuously removed while the separated catalyst phase was returned to the contacting zone. The excess $H_2S$ was removed from the accumulated product stream in a stabilizing operation, and the ethyl mercaptan was fractionally distilled from the hydrocarbon diluent. At the conclusion of the operation the catalyst was still active. The ethyl mercaptan recovered represented a yield of about 65 per cent of theory as calculated on the weight of ethylene charged. The product mercaptan recovered was equivalent to about 10 pounds per pound of catalyst charged.

Example II

The specificity and activity of saturated boron fluoride hydrate toward the olefin-$H_2S$ reaction were tested under the unfavorable conditions of a moderate atmospheric temperature and atmospheric pressure and low $H_2S$ to olefin mol ratio. The reaction was carried out with a continuous contacting procedure with a glass reaction vessel equipped with a mechanical stirrer and catalyst separator. A blend containing 10 volume per cent of commercial diisobutylene in cyclohexane was pressured to 60 p. s. i. with hydrogen sulfide to prepare the feed. The following conditions were employed in effecting the reaction:

| | |
|---|---|
| Total diisobutylene charged, ml. | 300 |
| $H_2S$-olefin, mol ratio | 1.3 |
| Feed-catalyst, volume ratio | 2 |
| Reaction time, minutes | 30 |
| Temperature, °F. | 76 |
| Pressure | Atm. |

After removal of the diluent and unreacted olefin, the yield of $C_8$ mercaptans amounted to 205 ml. The catalyst volume increased from 100 to 150 ml. during the reaction. The catalyst-soluble material was found to be substantially alkyl sulfides.

Example III

A $C_{12}$—$C_{14}$ fraction of olefins derived from the catalytic polymerization of refinery light olefins was converted to mercaptans in a continuous operation under pressure. A blend of 20 weight per cent of the olefinic material in n-pentane was prepared, and sufficient $H_2S$ was added under pressure to give a substantial molal excess over the olefin. This blend was continuously passed through the reaction zone containing boron fluoride mono-hydrate under the conditions listed below:

| | |
|---|---|
| $H_2S$-olefin, mol ratio | 2.8 |
| Feed-catalyst, volume ratio | 4.6 |
| Reaction time, minutes | 20 |
| Temperature, °F | 75–80 |
| Pressure, p. s. i. g | 200 |

The product stream was stabilized and washed with dilute alkali to remove hydrogen sulfide. The resulting hydrocarbon-mercaptan mixture was fractionated to separate mercaptans from diluent and unreacted olefin. It was found that 80 weight per cent of the olefin charged was converted to $C_4$, $C_8$, and $C_{12}$—$C_{14}$ mercaptans. Approximately 55 mol per cent of the olefin charge was recovered in the form of the corresponding mercaptan. This latter material was found to have valuable modifying properties when applied to the manufacture of Buna-type synthetic rubber.

Example IV

Cyclohexyl mercaptan was prepared from a blend of about 20 volume per cent cyclohexene in n-pentane together with sufficient $H_2S$ to give a molal excess over the olefin present. The feed blend was passed continuously through a 700 ml. turbo-mixer type reactor, charged with 150 ml. of boron fluoride hydrate prepared as in Example I, under the following conditions:

| | |
|---|---|
| $H_2S$-olefin, mol ratio | 4.4 |
| Reaction time, minutes | 20 |
| Temperature, °F | 100–105 |
| Pressure, p. s. i. g | 350 |

The catalyst was continuously recycled to the reaction zone while the hydrocarbon-product blend was continuously withdrawn to storage. After removal of the pentane, fractionation revealed that 75 mol per cent of the olefin charge was recovered as cyclohexyl mercaptan having a purity of about 95 per cent by weight.

Although the invention has been described in detail with particular reference to preferred modifications, it will be appreciated that the process may be effected in manners other than those described. Various alternative operations will be apparent to one skilled in the art in view of the instant disclosure, and the invention is accordingly to be limited only by the accompaning claims.

We claim:

1. In the formation of organic sulfur compounds by the catalytic addition of a compound selected from the group consisting of hydrogen sulfide and mercaptans to an olefin, the improvement which comprises conducting said addition reaction in the presence of a liquid catalyst complex comprising boron fluoride and water and having a water:$BF_3$ mol ratio within the range of about 2:1 to about 1:1.

2. A process for the formation of organic sulfur compounds which comprises contacting an olefinic hydrocarbon with hydrogen sulfide in the presence of a liquid catalyst formed by bringing together boron fluoride and water in such proportions as to form a catalyst in which the mol ratio of water to boron fluoride is within the range of about 1.5:1 to about 1:1, under conditions such that an addition of hydrogen sulfide to the olefinic hydrocarbon takes place.

3. A process which comprises contacting an olefinic hydrocarbon with hydrogen sulfide in the presence of water saturated with boron fluoride under conditions such that the addition of hydrogen sulfide to the olefinic hydrocarbon takes place.

4. The process of claim 3 in which reactants are maintained substantially in liquid phase.

5. A process for producing a mercaptan which comprises contacting an olefinic hydrocarbon with at least a stoichiometric amount of hydrogen sulfide in the presence of a liquid catalyst comprising effective amounts of boron fluoride hydrate complex in which the mol ratio of water to boron fluoride is within the range of about 2:1 to about 1:1 under conditions effecting the condensation reaction between hydrogen sulfide and the olefinic hydrocarbon to produce the mercaptan.

6. A process for producing mercaptans which comprises contacting an olefin with hydrogen sulfide in the presence of a catalyst essentially comprising hydrated boron fluoride in the form of a liquid complex having a water:$BF_3$ mol ratio within the range of about 1.5:1 to about 1:1 at a temperature within the range of 32° F. to 150° F. under conditions effecting the condensation reaction between hydrogen sulfide and the olefin to produce a mercaptan.

7. A process for producing mercaptans which comprises contacting an olefinic hydrocarbon with hydrogen sulfide in admixture with an inert liquid hydrocarbon diluent in the presence of a liquid catalyst comprising effective amounts of an addition compound of boron fluoride and water having a water:$BF_3$ mol ratio within the range of about 2:1 to about 1:1 at a temperature within the range of about 32° F. to about 150° F. under conditions effecting the addition of hydrogen sulfide to the olefinic hydrocarbon as the principal reaction of the process.

8. The process of claim 7 in which a hydrogen sulfide to olefinic hydrocarbon mol ratio greater than one is maintained.

9. The process of claim 3 in which said olefinic hydrocarbon is an aliphatic monoolefin.

10. The process of claim 3 in which said olefinic hydrocarbon is ethylene.

11. The process of claim 3 in which said olefinic hydrocarbon is a cyclo-olefin.

12. The process of claim 3 in which said olefinic hydrocarbon is cyclohexene.

13. A process for producing high-boiling mercaptans which comprises separating from effluents of an olefin polymerization process an olefinic hydrocarbon fraction essentially comprising olefins having from 12 to 14 carbon atoms per molecule, contacting said fraction together with a liquid saturated hydrocarbon diluent and hydrogen sulfide, under sufficient pressure to dissolve in the liquid reaction mixture a molar excess of hydrogen sulfide relative to the olefins present, with a liquid catalyst comprising effective amounts of boron fluoride hydrate complex having a water:$BF_3$ mol ratio within the range of about 1.5:1 to about 1:1 at a temperature within the range of about 32° F. to about 150° F. for a time such as to effect substantial addition of hydrogen sulfide to olefins, and recovering a mercaptan fraction comprising mercaptans so produced having from 12 to 14 carbon atoms per molecule.

14. A process for producing high-boiling mercaptans which comprises contacting an olefin of from 12 to 14 carbon atoms per molecule with hydrogen sulfide at a temperature within the range of about 32° F. to about 150° F. in the presence of a catalyst consisting of a liquid complex of boron fluoride and water having a water:$BF_3$ mol ratio within the range of about 2:1 to about 1:1, thereby producing a mercaptan having from 12 to 14 carbon atoms per molecule as the principal product of the process.

WALTER A. SCHULZE.
WILLIE W. CROUCH.

REFERENCES CITED

The following references are of record in the file of this patent:

UNITED STATES PATENTS

| Number | Name | Date |
|---|---|---|
| 1,836,170 | Johansen | Dec. 15, 1931 |
| 1,836,171 | Johansen | Dec. 15, 1931 |
| 1,836,183 | Johansen | Dec. 15, 1931 |
| 2,051,807 | Allen | Aug. 25, 1936 |
| 2,052,268 | Williams | Aug. 25, 1936 |
| 2,296,399 | Otto | Sept. 22, 1942 |
| 2,352,435 | Hoeffelman | June 27, 1944 |

FOREIGN PATENTS

| Number | Country | Date |
|---|---|---|
| 532,676 | Great Britain | Jan. 29, 1941 |